Nov. 29, 1960    S. H. SCHWARTZ    2,961,833
HEATER CONTROL DIVERTER
Filed Sept. 25, 1958    6 Sheets-Sheet 1

Fig. 1

Inventor
Samuel H. Schwartz

Nov. 29, 1960 S. H. SCHWARTZ 2,961,833
HEATER CONTROL DIVERTER
Filed Sept. 25, 1958 6 Sheets-Sheet 2

Inventor
Samuel H. Schwartz

Nov. 29, 1960 S. H. SCHWARTZ 2,961,833
HEATER CONTROL DIVERTER
Filed Sept. 25, 1958 6 Sheets-Sheet 3

Inventor
Samuel H. Schwartz
By Hill, Sherman, Meroni, Gross & Simpson Attys

Nov. 29, 1960  S. H. SCHWARTZ  2,961,833
HEATER CONTROL DIVERTER
Filed Sept. 25, 1958
6 Sheets-Sheet 4

Inventor
Samuel H. Schwartz

Inventor
Samuel H. Schwartz

Nov. 29, 1960  S. H. SCHWARTZ  2,961,833
HEATER CONTROL DIVERTER
Filed Sept. 25, 1958  6 Sheets-Sheet 6

Inventor
Samuel H. Schwartz

United States Patent Office 2,961,833
Patented Nov. 29, 1960

2,961,833
HEATER CONTROL DIVERTER

Samuel H. Schwartz, Deerfield, Ill., assignor to The Dole Valve Company, Morton Grove, Ill., a corporation of Illinois Filed Sept. 25, 1958, Ser. No. 763,306

12 Claims. (Cl. 60—60)

This invention relates to improvements in vacuum control devices and more particularly relates to an improved vacuum control device particularly adapted for controlling the heating and cooling of the passenger compartment of an automotive vehicle.

A principal object of the invention is to provide a simplified form of vacuum control device for more accurately controlling the heating, cooling and ventilating of the passenger compartments of automotive vehicles, all by the operation of a simple regulation and distributor valve arrangement operated by a single knob.

Another object of the invention is to provide a single knob vacuum control device for controlling the operation of the air conditioner, heater and ventilator of an automotive vehicle, in which the air conditioning, heating and ventilating operations are controlled independently of each other by a simple diverter valve in cooperation with a vacuum regulator valve.

A still further object of the invention is to provide a single knob vacuum control device for connecting a series of vacuum motors with a source of vacuum, utilizing a novel form of diverter valve, so constructed and arranged as to connect certain vacuum motors with input vacuum to the valve in one position of the valve and with modulated vacuum in another position of the valve to effect full or partial operation of the selected vacuum motors in accordance with the position of the control device.

A still further object of the invention is to provide an efficient form of vacuum control device selectively connecting individual vacuum motors to a source of vacuum for controlling an automotive, heating, ventilating and air conditioning system for the passenger compartment of an automotive vehicle, in which a single vacuum regulator valve and a vacuum diverter valve cooperating with the vacuum regulator valve effect a series of individual control operations of the respective vacuum motors independently of each other in accordance with the required positions of the vacuum motors, to control the desired heating, cooling and ventilating operations, all by the operation of a single knob.

A still further object of the invention is to provide a novel and improved form of vacuum control device in which a vacuum regulator valve modulates input vacuum and a single vacuum diverter valve cooperating with the vacuum regulator valve is operable to selectively supply vacuum to certain vacuum motors at modulated vacuum, to certain other vacuum motors at input vacuum and to certain other vacuum motors at modulated vacuum and input vacuum in accordance with the position of operation of a common control means for the vacuum regulator and diverter valves.

A still further object of the invention is to provide a simplified and improved form of vacuum diverter valve in which a single rotatable disk controls the operation of a series of vacuum motors and connects the vacuum motors to vacuum sufficient to effect a required operation, all by operation of a single knob.

These and other objects of the invention will appear from time to time as the following specification proceeds and with reference to the accompanying drawings wherein.

Figure 1:
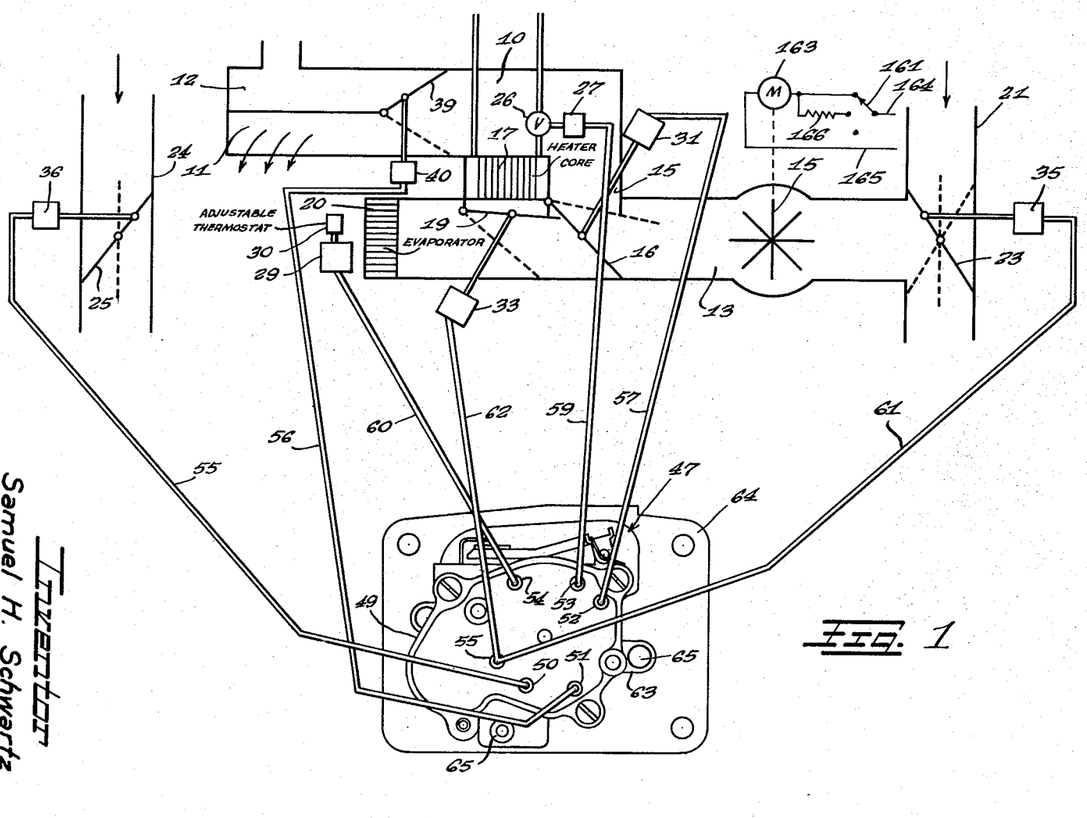
Figure 1 is a diagrammatic view, diagrammatically illustrating a control system for heating, ventilating and cooling the passenger compartment of an automotive vehicle, in which the heating, cooling, ventilating and defrosting operations are controlled in accordance with the principles of the present invention.
Figure 2:
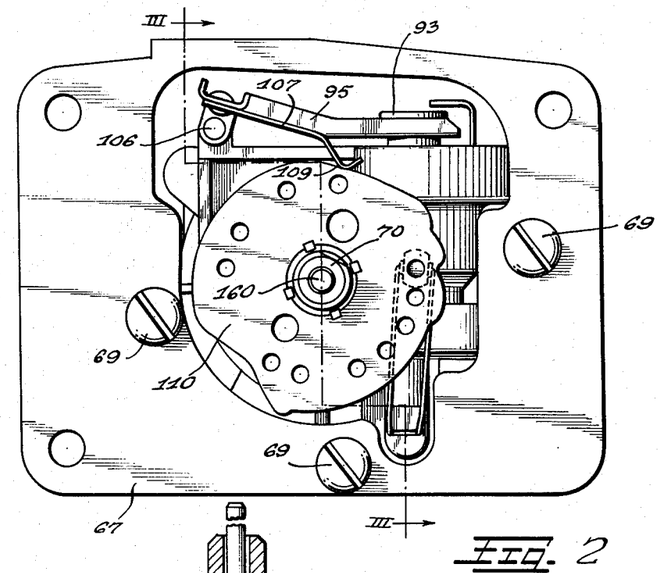
Figure 2 is a top plan view of the vacuum control and distributor valve utilized in the system illustrated in Figure 1.

In the embodiment of the invention illustrated in the drawings, I have diagrammatically shown in Figure 1 an illustrative form of heating and air conditioning system for an automotive vehicle, controlled in accordance with the principles of the present invention. The heating and the air conditioning shown, includes a duct 10 having a chamber 11 having communication with the passenger compartment of the automotive vehicle for supplying heated air thereto and a chamber 12 therein having communication with the windshield through the usual slots (not shown) behind the windshield for supplying air along the inside of the windshield for defrosting purposes under the control of a damper 39. A duct 13 having a blower 15 therein is shown as extending parallel to the duct 10 and as having communication therewith under the control of a by-pass damper 16 and through a heater core 17, under the control of a damper 19.

The duct 13 also has an evaporator 20 of an air conditioner (not shown) at an end thereof, having communication with the passenger compartment of the automotive vehicle and cooling the air to be circulated through the passenger compartment by the blower 15. A ventilating duct 21 opening to the outside air at one end, and opening to the interior of the passenger compartment of the automotive vehicle at its opposite end, is shown as having communication with the opposite end of the duct 13 from the evaporator 20.

A damper 23 is provided in the duct 21, to direct outside air, air from the passenger compartment of the automotive vehicle or a mixture of outside air and air from the passenger compartment of the automotive vehicle into the duct 13, to accommodate the blower 15 to draw outside air, inside air or a mixture of outside air and inside air into the duct 13 to be circulated through the heater core 17 and to direct inside air through the evaporator 20 in accordance with the desired temperature of the passenger compartment. The damper 23 when in the intermediate position shown by dotted lines also accommodates outside air to flow directly into the passenger compartment.

An opposite air duct 24 from the duct 21 is provided to direct outside air into the passenger compartment of the automotive vehicle under the control of a damper 25.

The heater core 17 is supplied with hot water from the cooling system for the internal combustion engine of the automotive vehicle under the control of a hot water valve 26 operated by a vacuum motor 27 in a well known manner, so not herein shown or described further.

The temperature of the evaporator 20 is controlled by a vacuum motor 29 adjusting a thermostatic switch 30 in accordance with the desired temperature of the passenger compartment of the automotive vehicle as selected by a control valve 47. The damper 16 is provided to control the flow of outside air through the duct 10 into the passenger compartment of the automotive vehicle, the flow of air to the heater core 17 and the evaporator 20 and to by-pass a part of the air into the duct 10 prior to passing into said duct through the heater core 17. A vacuum motor 31 is provided to position the damper 16 in the required position of adjustment, it being understood that the position of the damper 16 is dependent upon the travel of the vacuum motor and the amount of output vacuum connected therewith.

The damper 19 shuts off the passage of air through the heater core 17 when it is desired to circulate air through the evaporator 20 and is moved into its full open or closed position by a vacuum motor 33.

The damper 23 is operated by a vacuum motor 35 supplied with vacuum in accordance with the desired position of said damper and moved to the dotted line position shown in Figure 1 to direct outside air to the duct 13 by full vacuum at the value of vacuum at the source of vacuum.

The damper 25 is operated by a vacuum motor 36 connected to a source of regulated or modulated vacuum, the vacuum being varied in accordance with the desired position of the damper and the quantity of outside air, to be circulated through the passenger compartment of the automotive vehicle.

The defroster damper 39 is positioned in the solid line position shown in Figure 1 or the dotted line position shown in this figure by operation of a vacuum motor 40. The vacuum motor 40 is operated by vacuum at source vacuum, since there is no intermediate position for said damper and the damper is moved continuously from the solid line position shown in Figure 1 to the dotted line position shown in this figure, upon the connection of said vacuum motor to the source of vacuum.

Figures 6, 13:
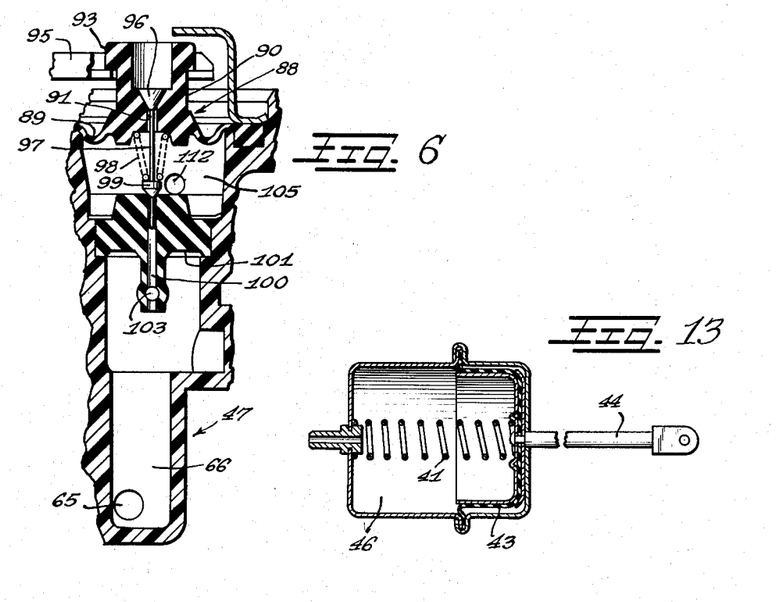
Figure 6 is an enlarged fragmentary detail sectional view, showing certain details of the vacuum regulator valve not shown in Figure 4.
Figure 13 is a sectional view taken through an illustrative form of vacuum motor which may effect a control or ventilating operation.

The vacuum motors 27, 29, 31, 33, 35, 36 and 40 may all be well known forms of vacuum motors like the vacuum motor shown in Figure 13, in which a spring 41 acting against a diaphragm 43, positions a rod 44 of the vacuum motor in an extended position, and in which vacuum in a vacuum chamber 46 acts against the diaphragm 43 to move the diaphragm and rod 44 against the spring 41 in accordance with the vacuum within the chamber 46. The vacuum motors may be of any well known form, so need not herein be shown or described further.

It may be seen from the foregoing that the vacuum motors 27, 33 and 40 effect their respective operations by full travel of the vacuum motors, effected by the connection of the vacuum motors to vacuum input connected with a source of vacuum at full vacuum at the source of vacuum.

The vacuum motors 29 and 36, however, vary the positions of the members operated thereby in accordance with the vacuum connected with said vacuum motors. Thus, the members operated by the vacuum motors 29 and 36 may gradually be moved from one position to another and may be held in any intermediate position by vacuum connected to said motors, the vacuum connected to said motors hereinafter being referred to as modulated or regulated vacuum.

The vacuum motors 31 and 35, however, may be supplied with modulated or regulated vacuum to regulate the positions of the respective dampers 16 and 23 operated thereby and to hold said dampers in these positions or may be instantaneously moved from the solid to their dotted line positions, when it is desired to fully close the dampers. The vacuum motors 31 and 35 may thus be supplied with regulated or modulated vacuum when it is desired to regulate the positions of the respective dampers 16 and 23 or may be supplied with vacuum at source vacuum when it is desired to instantaneously open or close the dampers.

In Figure 1, I have diagrammatically shown in bottom plan view the vacuum modulator or regulator and diverter valve 47, so arranged as to supply vacuum at source vacuum to certain of the vacuum motors, to supply modulated vacuum to certain other of the vacuum motors, and to supply modulated vacuum to other of the vacuum motors in one position of the valve and source vacuum to the same vacuum motors in another position of the valve.

The vacuum regulator valve 47 is shown as having a lower body part 49 having vacuum outputs 50, 51, 52, 53, 54 and 55 leading therefrom. The vacuum output 50 is shown as being connected with the vacuum motor 36 through a vacuum line 55, to supply modulated vacuum to the vacuum motor 36 to position the damper 25 in the desired position in accordance with the position of the vacuum modulator and diverter valve. The vacuum output 51 is connected with the vacuum motor 40 through a vacuum line 56 to supply source vacuum to said motor to effect instantaneous movement of the damper 39 from its solid to its dotted line position upon the supply of vacuum to the respective vacuum motor.

The vacuum output 52 is shown as being connected with the vacuum motor 31 through a vacuum line 57 and serves to supply modulated or source vacuum to the vacuum motor 31 to vary the position of the damper 16 in accordance with the amount of vacuum connected to the vacuum motor 31 and to instantaneously move the damper 16 from its open to its closed positions when connected to source vacuum.

The vacuum output 53 is shown as being connected with the vacuum motor 27 through a vacuum line 59. The vacuum output 53 may be connected with vacuum at source vacuum upon the proper positioning of the vacuum modulator and diverter valve 47, to instantaneously move the water valve 26 into its open or closed positions.

The vacuum output 54 is connected with the vacuum motor 29 through a vacuum line 60 and is arranged to supply modulated vacuum to the vacuum motor 29 to vary the temperature setting of the thermostatic switch in accordance with the positioning of the vacuum regulator and control valve 47.

The vacuum output 55 is shown as having connection with the vacuum motor 35 through a vacuum line 61. The vacuum output 55 is connected by operation of the valve 47 to supply modulated or source vacuum to the vacuum motor 35 in accordance with the position of the valve 47, to regulate the position of the damper 23 or to move said damper to a full open or closed position as required.

The vacuum output 55 is also connected with the vacuum motor 33 through a vacuum line 62. The vacuum motor 33 is thus operated with the vacuum motor 35, and when the damper 23 is in position to cut off the flow of fresh air into the passenger compartment of the automotive vehicle, the damper 19 will be closed, as shown in Figure 1. In the intermediate positions of the damper 23, the damper 19 will also be in its intermediate positions. When the damper 19 is in its closed position, the vacuum output 53 will be vented to atmosphere and the valve 26 will close. The air conditioner 20 will also be shut off. The air by-passed through the heater core 17 or the evaporator 20 will, therefore, have no affect on the temperature of the passenger compartment of the vehicle.

Figure 3:
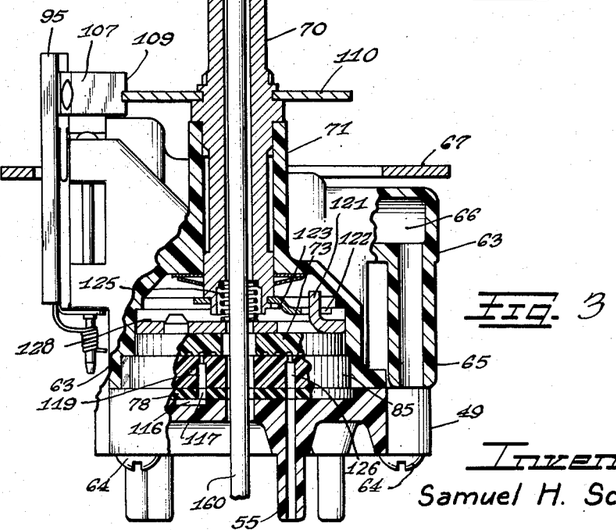
Figure 3 is a fragmentary vertical sectional view taken through the vacuum control and distributor valve shown in Figure 2.
Figures 4, 5, 11:
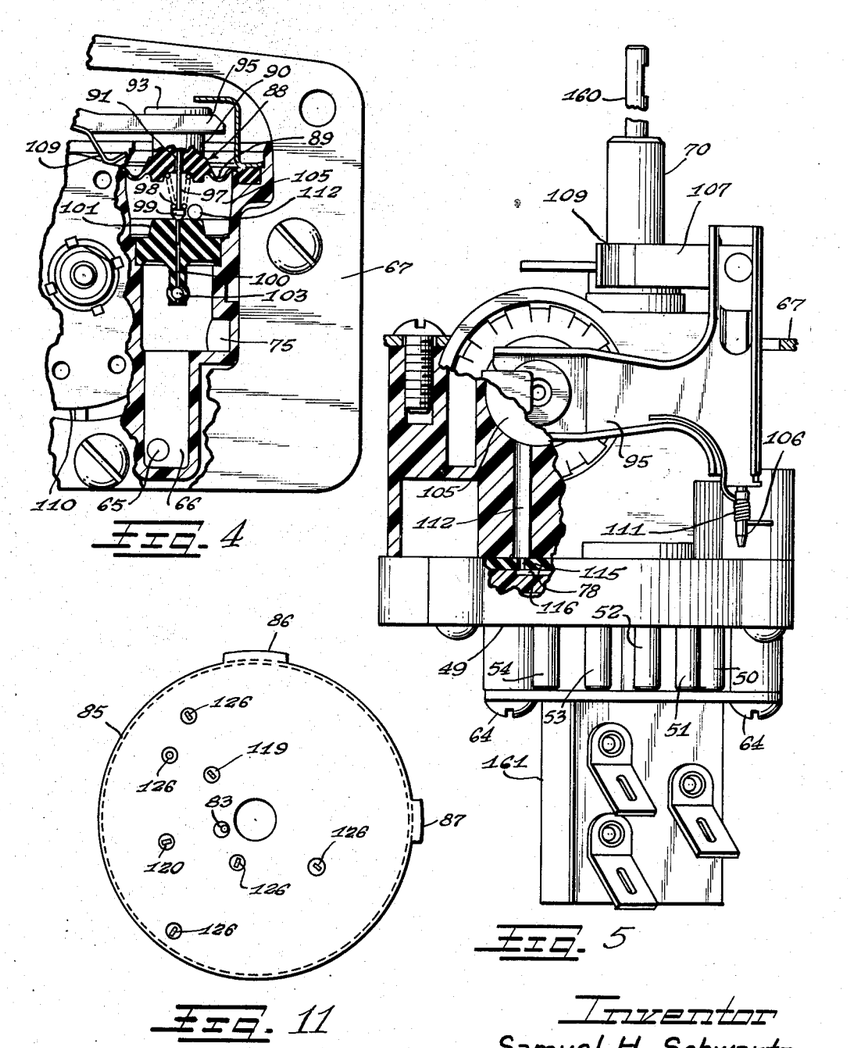
Figure 4 is a detail fragmentary sectional view taken through the vacuum regulator valve, with certain parts broken away and with certain parts removed.
Figure 5 is a fragmentary end view of the valve shown in Figure 2, with the mounting plate for the valve removed and with certain parts of the valve shown in vertical section.
Figure 11 is an enlarged plan view of the diverter plate, cooperating with the diverter valve and communicating with the vacuum output from the valve body.

The vacuum modulator and diverter valve 47, generally shown in Figures 2 to 7 includes the lower body part 49 having the vacuum outputs 50, 51, 52, 53, 54 and 55 leading thereinto from the bottom thereof and an upper mating body part 63 secured thereto as by machine screws 64. The upper body part 63 has a vacuum input 65 leading therefrom and adapted to be connected with a suitable source of vacuum, such as, the intake manifold of the internal combustion engine for the automotive vehicle. The vacuum input 65 has communication with a valve chamber 66 at its upper end, leading transversely of the upper body part 63, as shown in Figures 3 and 4.

The upper body part 63 of the vacuum modulator and diverter valve 47 is shown as being mounted on a mounting plate 67 as by machine screws 69. The mounting plate 67 may be mounted behind the dashboard of the automotive vehicle, and supports the entire valve and the fluid conductors leading thereinto and therefrom, behind the dashboard, out of sight.

A hollow operating shaft 70 is rotatably mounted in a boss portion 71 of the upper body part 63, and is adapted to extend through a suitable apertured portion of the dashboard (not shown), of the automotive vehicle, to operate a rotary disc diverter valve 73. The hollow shaft 70 may have a knob or dial plate (not shown) secured thereto, having indicia thereon cooperating with indicia on the dashboard to indicate the positions of the diverter valve 73 and the various positions of adjustment of the various dampers, and the hot water valve and air conditioner.

Figure 7:
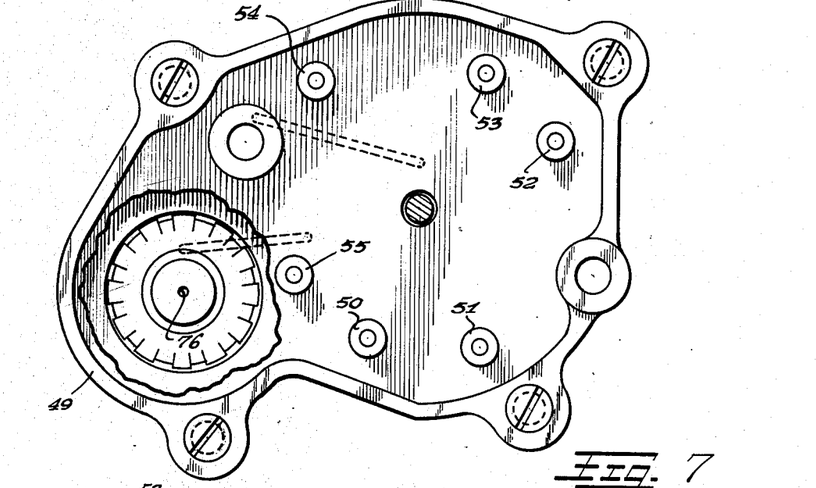
Figure 7 is an enlarged bottom plan view of the valve with certain parts thereof removed.
Figure 8:
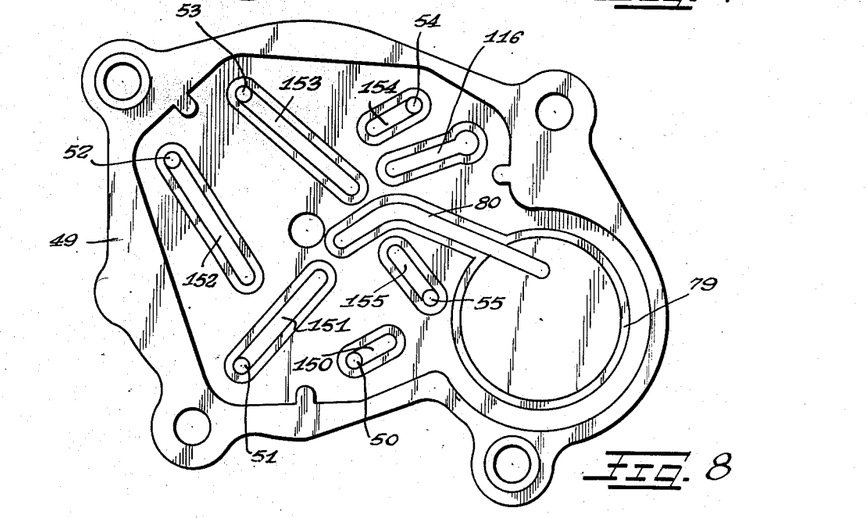
Figure 8 is an enlarged plan view of the bottom part of the valve body.
Figure 12:
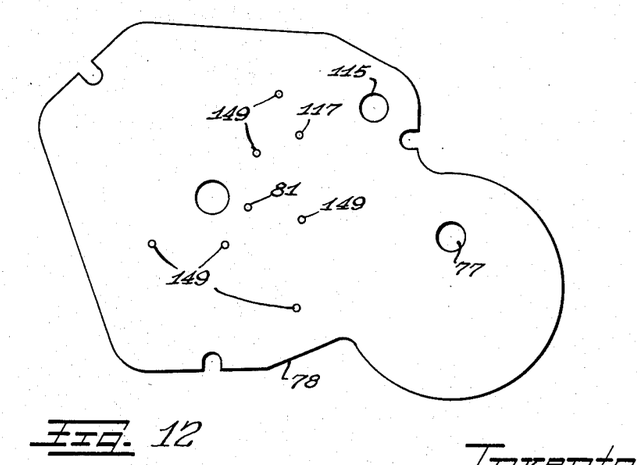
Figure 12 is an enlarged detail view illustrating the sealing plate for association with the bottom body part shown in Figure 7.

The valve chamber 66 has a passageway 75 leading downwardly therefrom and opening through a restricted orifice 76 opening to the bottom of the upper body part 63 (Figure 7). The restricted orifice 76 is in registry with and has communication with an orifice 77 leading through a resilient sealing plate 78 mounted in the lower body part 49. The orifice 77 registers within a circular rib 79 extending upwardly from the bottom of the lower body part 49 and having communication with a ribbed channel 80 closed at its outer end. The orifice 76 opening to the bottom of the body part 13 is within the margins of the circular rib 79 when the valve is assembled and in alignment with the orifice 77 leading through the sealing plate 78. The ribbed channel 80 in turn registers with an orifice 81 in the sealing plate 78 and leading therethrough (Figure 12). The orifice 81 registers with an orifice 83 leading axially through a diverter plate 85 (Figure 11) mounted in the bottom of the upper casing part 63 and having sealing engagement with the diverter valve 73.

The diverter plate 85 has spaced lugs 86 and 87 projecting from the periphery thereof, for registry with corresponding recesses (not shown) in the bottom of the lower body part 63, to retain said diverter plate in position to effect a vacuum connection to the diverter valve 73 at source vacuum, through the diverter plate 85.

The diverter valve 73, connected with the source of vacuum at source vacuum may distribute source vacuum to the vacuum motors 27, 31, 33, 35 and 40 in certain selected positions of adjustment of said diverter valve, as will hereinafter more clearly appear as this specification proceeds.

The valve chamber 66 is shown in Figure 4 as being connected with a vacuum regulator chamber 105 through a check valve 101. Vacuum in the vacuum regulator chamber is regulated by operation of a vacuum modulator or regulator valve 88, modulating the vacuum in accordance with the position of the diverter valve 73, to provide a regulated or modulated vacuum to certain of the vacuum motors to accurately regulate the positions thereof and the devices operated thereby.

The vacuum regulator or modulator valve 88 is similar to that shown and described in an application Serial No. 703,408 filed by Frank E. Obermaier on December 17, 1957 and entitled "Vacuum Regulator and Control System" and includes a diaphragm 89 extending across the outer end of the vacuum regulator chamber 105 and suitably sealed to the body part 64 about said vacuum regulator chamber. The diaphragm 89 has a central thickened generally cylindrical portion 90 having a port 91 leading therethrough concentric with the center thereof.

The thickened cylindrical portion has a flange 93 extending about the outer end thereof abutted by the free end portion of an adjusting lever 95.

A valve 96 on the end of the stem 97 is seated on the port 91 and is biased into engagement with said port by a spring 98, seated at one end on the undersurface of the diaphragm 89 and at its opposite end on a valve 99 on the inner end of the stem 97 and engageable with the end of a passageway 100, through the check valve 101.

The check valve 101 is shown as being a resilient check valve like that shown and described in application Serial No. 703,355 filed by Frank E. Obermaier on December 17, 1957 and entitled "Selective Automotive Vacuum Control Valve," so need not herein be described in detail except to mention that a passageway 100 through the valve is elongated at its lower end portion and has a pin 103 stretching the passageway, and retained in position by stops (not shown). The walls of the elongated portion of the passageway normally engage the pin 103, to prevent the passage of air at atmospheric pressure into the lower part of the chamber 66. The walls of the elongated portion of the passageway, however, will spread apart to accommodate the passage of air through the passageway 100 into the valve chamber 66 when vacuum in the chamber 66 is greater than the vacuum in the vacuum regulator chamber 105.

The lever 95 is mounted on the upper body part 63 on a pivot pin 106 and has a spring arm 107 extending from the pivot thereof toward the free end thereof having a follower end portion 109 riding on the face of a cam 110 mounted on the hollow shaft 70 and operated thereby. A torsion spring 111 mounted on the pivot pin 106 is provided to bias the follower 109 into engagement with the face of the cam 110. The lever 95 acting against the flange 93 thus lifts the valve 99 off of its seat and opens the passageway 100 in the check valve 101, to accommodate air to be drawn from a passageway 112 leading vertically through the upper body part and opening into the vacuum regulator chamber 105.

As the cam 110 is rotated and the follower 109 is engaged by a high part of the cam, the face of the cam 110 will raise the follower 109, the spring lever 107 and the lever 95 and move the valve 99 off its seat to connect the vacuum input 65 with the vacuum regulator chamber 105 and draw vacuum through said chamber at source vacuum when the valve 96 is closed.

If, however, the vacuum in the vacuum regulator chamber 105 should rise above a predetermined desired value, determined by the setting of the lever 95, and the tension of the spring 98, the vacuum in the vacuum regulator chamber 105 will move the diaphragm 89 inwardly against the spring lever 107, and open the valve 96 and accommodate air at atmospheric pressure to flow into the vacuum modulator chamber 105 until the vacuum within said chamber is balanced, in accordance with the position of the follower end portion 109 of the spring lever 107 along the face of the cam 110. At this time the valve 96 will close. The valve 99 will then open upon a further decrease in vacuum in the vacuum control chamber 105. The vacuum in the vacuum control chamber 105 is thus regulated by the position of the follower end portion 109 of the spring lever 107 along the face of the cam 110 and the tension of the spring lever 107, as well as the loading of the spring 98. The vacuum in the vacuum modulator chamber 105 may thus be regulated to various desired values of vacuum by the position of the cam 110 with respect to the follower end portion 109 of the spring lever 107, to effect the operation of a desired vacuum motor for the travel required, as for example, to set the thermostat 40 to a desired temperature setting, or to set either of the air vents 25 or 33 in various intermediate positions between open and closed positions.

The passageway 112 passes vertically through the upper valve body part 64 and opens at the bottom of said upper valve body part to an orifice 115 in the sealing plate 78. The orifice 115 in turn opens into a ribbed channel or enclosure 116 extending along the top surface of the lower body part 49 and having communication with an input orifice 117 in the sealing plate 78, communicating with an axial passageway 119 leading through the diverter plate 85. The axial passageway 119 in turn communicates with the valve face of the diverter valve disc 73.

The diverter valve disc 73 may be made from a resilient material, such as rubber or one of the well known substitutes for rubber and is mounted on a drive plate 128 having tangs 121 pressed therefrom, as shown in Figure 3. The tangs 121 have engagement with slots 122 formed in a drive member 123 mounted on the inner end of the hollow shaft 70 and rotatably driven by said shaft upon rotation thereof. A compression spring 125 seated within the hollow shaft 70 and abutting the drive plate 128, is provided to bias the face of the diverter valve 73 into sealing engagement with the diverter plate 85, to accommodate the drawing in of vacuum through one or more of a series of axial vacuum passageways 126 leading through the diverter plate 85 and to thereby accommodate the drawing in of vacuum through the selected vacuum outputs in accordance with the position of the diverter valve 73 with respect to the stationary diverter disc or plate 85.

The diverter valve 73 is shown as being in the form of a flat disc having connected ribs extending from the face thereof forming a channeled modulated vacuum labyrinth passageway 120 sealed to the diverter plate 85. The channelled labyrinth passageway 120 registers with the axial vacuum input pasageway 119 leading through the diverter plate 85 to provide a supply of modulated vacuum to said diverter valve disc for communication with selective of the vacuum outputs 50, 52, 54 and 55 in accordance with the position of the diverter valve disc 73 with respect to the diverter plate 85.

Figure 9:
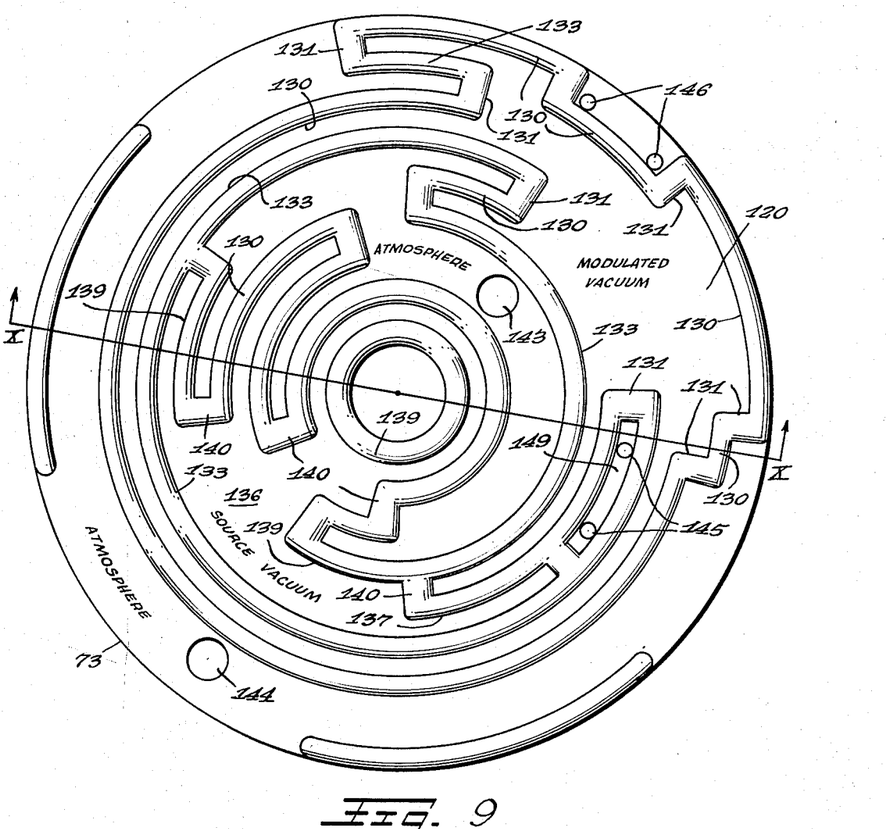
Figure 9 is an enlarged plan view of the diverter valve.
Figure 10:
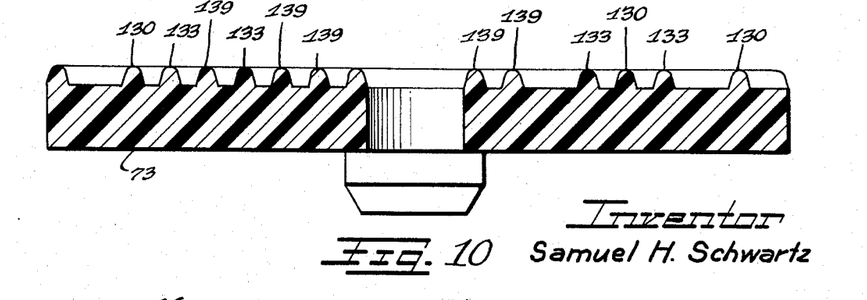
Figure 10 is a transverse sectional view of the diverter valve shown in Figure 6 taken substantially along line X—X of Figure 9.

As shown in Figures 9 and 10, the channelled modulated vacuum labyrinth pasageway 120 is formed by the inner margins of a plurality of concentric arcuate ribs 130 and the outer margins of inwardly spaced concentric ribs 133. The ribs 130 and 133 have different radial spacings from the center of the valve disc 73 and are shown as being connected together by a plurality of radial ribs 131. A continuous modulated vacuum passageway is thus formed between the face of the valve disc 73 and the diverter plate 85, to register with the required axial passageways 126 leading though the diverter plate 85, to connect the selected vacuum outputs 50, 52, 54 and 55 with modulated vacuum in accordance with the selected position of adjustment of the diverter valve disc 73.

The vacuum input passageway 83 leading through the diverter plate 85 has communication with a labyrinth passageway 136 concentric with the labyrinth passageway 120 and formed by the inner margin of a portion of an arcuate rib 133, the outer margin of a portion of an arcuate rib 130 and the outer margins of arcuate ribs 139 spaced inwardly of the arcuate rib 133 at different radial spacings. The ribs 130, 133 and 139 are connected together by radial ribs 140 to form a closed labyrinth passage or channel 136. The labyrinth passageway 136 closed by the diverter plate 85 thus supplies vacuum through certain of the vacuum output passageways 126 in the diverter disc 85 for connecting the vacuum outputs 53, 54 and 55 with source vacuum in accordance with the selected position of adjustment of the diverter valve 73 with respect to the diverter plate 85.

The diverter valve 73 also has a series of vent passageways 143, 144, 145 and 146 leading axially therethrough and through the drive plate 120, to vent certain of the vacuum motors to atmosphere when not in operation, and during operation of certain other of the vacuum motors. The vent 143 is within a labyrinth passageway 147 defined by the inner margins of certain of the arcuate ribs 133 and the outer margins of certain of the arcuate ribs 139 and connected together by the radial ribs 140 and 131. The vent 144 is shown as being located outwardly of the arcuate rib 130 in a passageway defined by the outer margins of the outermost arcuate rib 130 and the radial ribs 131. The vents 145 are located in a segmental passageway 149 formed by the inner margins of concentric arcuate ribs 130 and 133, while the vents 146, 146 are located adjacent the periphery of the disc valve 73 outwardly of the outer margin of an arcuate rib 130 and adjacent spaced radial ribs 131.

The vent passageways 143, 144, 145 and 146 are so located that when it is desired to operate one vacuum motor and render the other vacuum motor, or a series of vacuum motors inoperative, the vent passageways will vent the required vacuum outputs to atmosphere accommodating the return spring for the vacuum motor to return the vacuum motor and its damper or the device operated thereby.

The sealing plate 78 has spaced vacuum passageways 149 leading therethrough registering with the axial passageways 126 leading through the diverter plate 85 and connected with the vacuum outputs 50, 51, 52, 53, 54 and 55 through a series of ribbed channels 151, 152, 153, 154 and 155 formed in the bottom of the bottom body part 49 and sealed by the sealing plate 78.

Referring now to Figures 2, 3, 4, 5 and 6, and the operation of connecting one of the vacuum outputs to a source of vacuum at modulated vacuum, as the follower portion 109 of the spring lever 107 rides along a high portion of the cam 110, the valve 99 will be opened in accordance with the required vacuum to operate an associated vacuum motor, to move into a selected position. Vacuum will then pass through the passageway 112 into the vacuum modulating chamber 105 through the check valve 101 and the vacuum input 65. This will draw vacuum through the port 115 in the sealing plate 78, through the ribbed channel 116, through the port 117 in the sealing plate 78 and through the port 119 in the diverter plate 85. This will then draw vacuum though the modulated vacuum passageway 120 in the upper face of the diverter valve 73.

Assuming the disc valve 73 is in position to connect the vacuum output 55 to a source of modulated vacuum, vacuum will be drawn along the modulated vacuum labyrinth passageway 120 on the face of the valve 73 through a registering axial passageway 126 in the diverter plate 85, through the channelled passageway 155 in the lower body part 49 and in through the vacuum output 55. This will effect operation of the vacuum motors 33 and 35 to operate the dampers 19 and 23 toward their dotted line positions shown in Figure 1, the extent of movement of said dampers being dependent upon the vacuum in the modulated vacuum chamber 105. In this position of the disc valve 73, fresh air may enter the passenger compartment of the automotive vehicle through the fresh air intake duct 21. Upon continued turning of the hollow shaft 70, the pressure of the modulated vacuum will be increased to continue movement of the dampers 19 and 23 to first fully open the duct 21 to outside air and to then move the dampers 19 and 23 into the dotted line positions shown in Figure 1 to accommodate fresh air to be forced through the heater core 17 by the blower 15 or by-passed past said heater core by the by-pass damper 16.

Upon turning of the hollow shaft 70 and diverter valve 73 in position to effect operation of the air conditioner, the labyrinth passageway 120 will be moved in position to register with axial passageways 126 and 149 leading through the diverter plate 85 and the sealing plate 78 and through the channelled passageway 154, to connect the vacuum output 54 with a source of modulated vacuum, to effect operation of the vacuum motor 29 a distance sufficient to adjust the thermostat 30 to the required temperature adjustment, indicated by the dial knob (not shown) for operating the shaft 70. The vacuum output 55 will then be vented to atmosphere. The dampers 19 and 23 will then be moved to the solid line positions shown in Figure 1. The blower 15 will then circulate air from within the passenger compartment of the automotive vehicle through the duct 13 and evaporator 20 to effect cooling of the passenger compartment to the extent of the setting of the air conditioner thermostat 30. During cooling, the vacuum motor 31 is connected to vacuum at source vacuum to move the damper 16 into the dotted line position shown in Figure 1 to afford a direct circulation of air through the evaporator.

During heating of the automotive vehicle, the hollow shaft 70 and diverter valve 73 may be turned into position to connect the vacuum motors 27, 33 and 35 to source vacuum and vacuum motor 31 to modulated vacuum, or to vent the vacuum output 52 and vacuum motor 31 to atmosphere, depending upon whether it is desired to circulate a part of the air through the passenger compartment of the automotive vehicle prior to passing the air through the heater core 17. This will effect opening of the hot water valve 26, opening of the damper 19, to direct fresh air through the heater core 17, and movement of the damper 16 toward a position to block the by-pass of fresh air into the heating compartment of the automotive vehicle.

The diverter valve 73 may also be turned into position to open either of the dampers 23 or 25, to direct fresh air into the passenger compartment of the automotive vehicle, it being understood that in this position of the valves 73 modulated vacuum is supplied to the vacuum motors 35 and 36 in accordance with the desired position of opening of the dampers 23 and 25.

The diverter valve 73 may also be moved into a position to connect the vacuum motor 40 to source vacuum to open the defroster duct 12 and close the duct 11, to effect the circulation of either heated air or outside air along the inside of the windshield. The damper 39 is always moved into a fully open or fully closed position. The vacuum motor 40 is, therefore, always connected to vacuum at the source.

The hollow operating shaft 70 has a rod 160 extending along the hollow interior portion thereof and axially movable therealong to operate a switch 161 into position to energize a blower motor 163 through main line conductors 164 and 165 to effect the operation of the blower motor 163 and driving of the blower 15 at a high rate of speed. The switch 161 may also be moved into position to energize the motor 163 through a resistance 166, to effect operation of the blower motor 163 and the driving of the blower 15 at a lower rate of speed. A suitable indexing means for the rod 160 may be provided (not shown) to indicate the positions of the switch 161, it being understood that a knob (not shown) is mounted on the outer end of the rod 160 to effect movement thereof and operation of the switch 161 into its two energizing positions, the switch 161 being in an "off" position when the rod 160 is in its depressed position.

It will be understood from the foregoing that a simplified form of control device has been provided particularly adapted to control the heating and cooling of an automotive vehicle by operation of a series of vacuum motors, in which a single diverter valve may supply modulated vacuum to the vacuum motors in accordance with the required travel thereof, to effect an adjusting operation, and in which the valve may supply source vacuum to certain other vacuum motors in which it is desired that the vacuum motors travel for the full lengths of the strokes thereof, and in which the same valve may also supply either modulated or source vacuum to certain other of the vacuum motors, in which it is desired that the vacuum motors perform adjusting operations to adjust the temperature of the passenger compartment of the automotive vehicle and to connect the same vacuum motors to source vacuum upon further turning movement of the diverter valve, to provide full opening and closing of the dampers operated thereby where it is desired to quickly move the dampers to effect heating or cooling of the automotive vehicle.

It should further be understood that while the control device and system of the invention has been described for controlling the operation of a heater and air conditioner for an automotive vehicle, that it may also control the operation of the heater alone, the ventilating dampers alone or the air conditioner alone and may be used for various other work performing operations than the heating or cooling of an automotive vehicle.

While I have herein shown and described one form in which my invention may be embodied, it will be understood that various modifications and variations in the invention may be effected without departing from the spirit and scope of the novel concepts thereof, as defined by the claims appended hereto.

I claim as my invention:

1. In a vacuum control device, a valve body, a vacuum input adapted to be connected with a source of vacuum, a vacuum output adapted to be connected with a device to be operated by vacuum, a vacuum control chamber within said valve body, a valve in said vacuum control chamber, adjustably movable to modulate the vacuum in said chamber in accordance with the position of said valve, a diverter valve in said valve body in series with said first valve, connecting said vacuum output to said vacuum input at input vacuum or at modulated vacuum, in accordance with the position of said diverter valve, an operator for operating said diverter valve, and cam means operated by said operator for operating the first mentioned of said valves to effect the modulation in the vacuum in said vacuum control chamber in accordance with the position of said valve.

2. In a vacuum control device, a valve body, a vacuum input connected to said valve body, at least one vacuum output connected to said valve body, a vacuum motor adapted to be operated by vacuum and connected with said vacuum output, a vacuum control chamber within said valve body, a vacuum control valve in said vacuum control chamber, for modulating the vacuum in said vacuum control chamber, a diverter valve within said valve body, a vacuum connection from said vacuum control chamber to said diverter valve, connecting said diverter valve to vacuum, modulated by said vacuum control valve, an input vacuum connection connecting said vacuum input to said vacuum diverter valve, and means for operating said valves to effect the connection of said vacuum output to modulated vacuum through said vacuum connection, to effect an adjusting movement of said vacuum motor, and to source vacuum through said input vacuum connection, to effect movement of said vacuum motor for its full stroke.

3. In a vacuum control device, a valve body, a vacuum input connected to said valve body a plurality of vacuum outputs connected to said valve body, adapted to have connection with devices to be operated by a vacuum, a first valve in said valve body adjustable to modulate the vacuum at said vacuum output in accordance with the position of said valve, a second valve in said valve body operable to connect selected of said vacuum outputs to vacuum modulated by said first valve and to vacuum at said input, means for operating the second of said valves to connect certain of said vacuum outputs to vacuum at the vacuum at said vacuum input, to connect certain other of said vacuum outputs to vacuum modulated by said vacuum modulator valve and to connect certain other of said vacuum outputs to vacuum modulated by said vacuum modulator valve and to vacuum at said vacuum input, in accordance with the position of said vacuum modulator valve.

4. In a vacuum control device, a valve body, a vacuum input connected to said valve body a plurality of vacuum outputs connected to said valve body, adapted to have connection with devices to be operated by a vacuum, a first valve in said valve body adjustable to modulate the vacuum at said vacuum output in accordance with the position of said valve, a second valve in said valve body operable to connect selected of said vacuum outputs to vacuum modulated by said first valve and to vacuum at said input, means for operating the second of said valves to connect certain of said vacuum outputs to vacuum at the vacuum at said vacuum input, to connect certain other of said vacuum outputs to vacuum modulated by said vacuum modulator valve and to connect certain other of said vacuum outputs to vacuum modulated by said vacuum modulator valve and to vacuum at said vacuum input in accordance with the position of said vacuum modulator valve, an operator for operating the first of said valves, and cam means operated by said operator for operating the second of said valves to modulate the vacuum connected to the first of said valves.

5. In a vacuum control device, a valve body, a vacuum input connected with said valve body and having connection with a source of vacuum, a plurality of vacuum motors connected to said valve body, a device to be operated, connected with each of said vacuum motors and movable from non-operated to fully operated positions, vacuum control means in said valve body controlling the vacuum therein, a rotatable diverter valve in said valve body diverting the vacuum to selected of said vacuum motors, and connected to said vacuum input and to said vacuum control means, and controlling the amount of vacuum supplied to said vacuum motors in accordance with the position of said diverter valve.

6. In a vacuum control device, a valve body, a source of vacuum connected to said valve body, a plurality of vacuum motors connected to said valve body, a separate device to be operated connected with each of said vacuum motors and movable from non-operated to fully operated positions by operation of said vacuum motors, vacuum control means in said valve body varying the vacuum at said vacuum input in accordance with the required movement of said vacuum motors, a diverter valve in said valve body, means connecting said diverter valve with said vacuum control means, other means connecting said diverter valve with said vacuum input, means for operating said diverter valve to connect certain of said vacuum motors to vacuum at said vacuum input, to connect certain other of said vacuum motors to vacuum at said vacuum control valve, and to connect certain other of said vacuum motors to vacuum at said vacuum input and to vacuum modulated by said vacuum control means, an operating member for said diverter valve, and cam means operated by said operating member for operating said vacuum control means to vary the vacuum connected to said diverter valve in accordance with the position of said diverter valve.

7. In a vacuum control system, a valve body, a vacuum input connected to said valve body and adapted to be connected to a source of vacuum, a plurality of vacuum outputs connected to said valve body, a separate vacuum motor connected with each of said vacuum outputs, a separate device to be operated connected with each of said vacuum motors and movable between non-operated and fully operated positions, vacuum control means in said valve body for varying the vacuum from the vacuum at said vacuum input, a single diverter valve in said valve body cooperating with said vacuum control means, a passageway from said vacuum control means to said diverter valve, supplying vacuum to said diverter valve at regulated vacuum in accordance with the position of said vacuum control means, a second passageway in said valve body connecting said diverter valve to said vacuum input, and common operating means for said vacuum control means and said diverter valve, for operating said diverter valve to connect certain of said vacuum outputs to vacuum at said vacuum input, to connect certain other of said vacuum outputs to vacuum under the control of said vacuum control means, and to connect certain other of said vacuum outputs to vacuum modulated by said vacuum control means and to input vacuum, and cam means operated by said operator for controlling the position of said vacuum control means and the vacuum at said diverter valve.

8. A vacuum control valve comprising a valve body having a valve chamber therein, a valve disc rotatably mounted in said valve chamber and having ribs projecting from a face thereof defining vacuum passageway channels, a diverter plate mounted in said valve chamber and held from rotation with respect thereto, spring means biasing said ribs into engagement with said diverter plate and sealing the channels formed thereby, a plurality of vacuum outputs connected with said valve chamber through said diverter plate, a vacuum input connected with said valve body on the opposite side of said diverter plate from said vacuum outputs and having connection with said diverter valve through said diverter plate, and operating means for rotatably moving said diverter valve to selectively connect said vacuum input with selected of said vacuum outputs.

9. A vacuum control valve comprising a valve body, a vacuum input connected with said valve body, a plurality of vacuum outputs connected with said valve body, a rotatable diverter valve disc in said valve body, means for rotating said disc, a diverter disc abutting said diverter valve disc having a plurality of passageways leading axially therethrough, at least one of said passageways having connection with the vacuum input and certain other of said passageways having connection with selected of said vacuum outputs, said valve disc having a channelled diverter passageway therein opening to the face thereof and having sealing engagement with said diverter disc and defining a vacuum path from said vacuum input to certain of said vacuum outputs in accordance with the position of said diverter valve, and having another channelled passageway therein having sealing engagement with said diverter disc and vented to atmosphere to vent certain of said vacuum outputs to atmosphere.

10. A vacuum control valve comprising a valve body, a vacuum input connected with said valve body, a plurality of vacuum outputs connected with said valve body, a valve disc in said valve body, means for rotatably moving said valve disc, a diverter plate abutting said valve disc and having a plurality of spaced parallel passageways leading axially therethrough, at least one of said passageways having connection with a vacuum input, certain other of said passageways having connection with vacuum outputs, spring means biasing said valve disc into engagement with said diverter plate, a plurality of connected arcuate and radial ribs extending from the face of said valve disc and sealed by said diverter plate to define vacuum passageway channels registerable with certain of said vacuum output passageways in said diverter plate upon rotatable movement of said valve disc, and axial passageways leading through said valve disk, connecting certain of said passageways to atmosphere.

11. A vacuum control valve comprising a valve body having a valve chamber therein, a valve disc rotatably mounted in said valve chamber, means for rotatably moving said valve disc, a plurality of vacuum outputs connected with said valve chamber on one side of said diverter valve, a vacuum input connected with said valve body on the opposite side of said diverter valve from said vacuum outputs, a diverter plate abutting said diverter valve and having communication with said vacuum outputs, a vacuum input connection from said vacuum input to said diverter valve through said diverter plate, a vacuum control chamber in said valve body having communication with said vacuum input, vacuum control means in said vacuum control chamber for modulating the vacuum therein, a modulated vacuum connection from said vacuum control chamber to said diverter valve through said diverter plate, and means for operating said diverter valve and adjustably moving said vacuum control means, all under the control of a single operating member.

12. A vacuum control valve comprising a valve body having a valve chamber therein, a vale disc rotatably mounted in said valve chamber, said valve disc having connected ribs extending from the face thereof defining a plurality of labyrinth channelled passageways, a diverter plate abutting said ribs, spring means biasing said ribs into engagement with said diverter plate and sealing said ribs thereto, a plurality of vacuum outputs connected with said diverter valve through said diverter plate, a vacuum input connected with said diverter valve through said diverter plate, a vacuum control chamber connected with said vacuum input and having regulating valve means therein for varying the vacuum from the vacuum at said vacuum input, a vacuum connection from said vacuum control chamber to said diverter valve through said diverter plate, means for rotatably moving said diverter valve and for adjustably moving said vacuum regulating valve means to vary the vacuum in said vacuum control chamber, and certain of said ribs defining channelled passageways connecting certain of said vacuum outputs with said vacuum input at the vacuum of said vacuum input, certain other of said ribs forming channelled passageways connecting certain of said vacuum outputs with said vacuum control chamber, and said ribs being so arranged as to connect selective of said vacuum outputs through said vacuum modulating chamber in one position of said diverter valve and to said vacuum input in another position of said diverter valve to connect said inputs to modulated or to input vacuum at the selection of the operator of the valve.

References Cited in the file of this patent
UNITED STATES PATENTS

| | | |
|---|---|---|
| 2,218,936 | Melown | Oct. 22, 1940 |
| 2,402,499 | Lawrence | June 18, 1946 |
| 2,247,140 | Twyman | June 24, 1941 |
| 2,282,977 | Mast | May 12, 1942 |
| 2,433,443 | Edge | Dec. 30, 1947 |
| 2,664,708 | Norelius | Jan. 5, 1954 |